E. JORDAN.
Corn Sheller.
No. 107,919.
Patented Oct. 4, 1870.
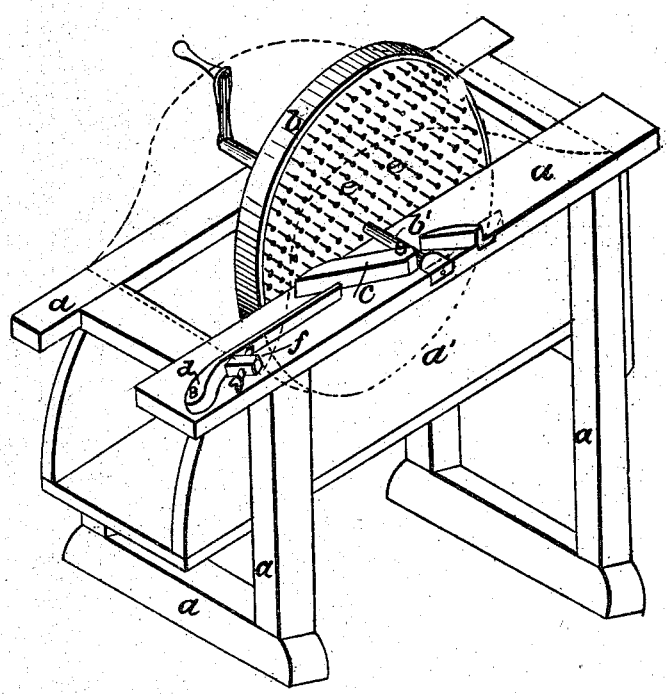
Witnesses
Andrew J. Martin.
Coswell Martin
Inventor
Elbert Jordan

UNITED STATES PATENT OFFICE.

ELBERT JORDAN, OF PICKENS COUNTY, ALABAMA.

IMPROVEMENT IN CORN-SHELLERS.

Specification forming part of Letters Patent No. 107,919, dated October 4, 1870.

*To all whom it may concern:*

Be it known that I, ELBERT JORDAN, in the county of Pickens and State of Alabama, have invented a new and useful Mode of Shelling Corn; and I do hereby declare that the following is a full and exact description.

The nature and object of my invention are to produce a machine for shelling corn which shall be cheap and simple in its construction, and at the same time as efficient and complete in its operation as the more expensive and complicated machines of metal.

In the drawing, $a$ represents the frame or support for the wheel by which the corn is to be shelled, which is constructed, in the ordinary manner, of wood, sufficiently heavy to render it firm and durable. The dimensions of the frame are about four and one-half feet in length by one and one-half foot in width. One end of said frame is elevated higher than the other, in order to give sufficient slant for the corn to run out as it is shelled.

The shelling-wheel $b$ is constructed of wood, and is about two and one-half feet in diameter, rendering it a sufficient balance-wheel of itself. Said wheel turns upon shaft $b'$, supported in journal-bearings upon the frame $a\ a$, a crank being attached to it to turn the wheel. Into the side of this wheel are driven wrought-iron nails, the heads being left projecting about one-half inch, as shown at $c\ c$, which serve to shell the corn as it passes through between the side of the trough $a'$ and the wheel.

$a'$ is a trough, into which the corn falls as it is shelled and is conducted from the machine. $e$ is a block or piece of wood, pivoted at one end to the frame $a$, and which, with the assistance of the pivoted spring $d$, serves to press the ears of corn against the side of the wheel. $f$ is a screw, by which the spring is regulated, giving any degree of pressure desired.

Having thus described my invention, what I claim, and desire to secure by Letters Patent, is—

The arrangement of the wheel $b$, provided with nails $c$, shaft $b'$, pivoted block $e$, spring $d$, set-screw $f$, and trough $a'$, all constructed and operating as shown and described, for the purposes set forth.

ELBERT JORDAN.

Witnesses:
W. E. CRIMM,
S. A. BERRY.